(12) United States Patent
Sawada et al.

(10) Patent No.: US 9,308,938 B2
(45) Date of Patent: Apr. 12, 2016

(54) VEHICLE POWER STEERING CONTROL APPARATUS

(75) Inventors: Shinji Sawada, Tokyo (JP); Hiroki Kato, Tokyo (JP)

(73) Assignee: FUJI JUKOGYO KABUSHIKI KAISHA, Tokyo (JP)

( * ) Notice: Subject to any disclaimer, the term of this patent is extended or adjusted under 35 U.S.C. 154(b) by 637 days.

(21) Appl. No.: 13/410,348

(22) Filed: Mar. 2, 2012

(65) Prior Publication Data
US 2012/0239252 A1 Sep. 20, 2012

(30) Foreign Application Priority Data

Mar. 15, 2011 (JP) ................................ 2011-056804

(51) Int. Cl.
*B60W 30/09* (2012.01)
*B62D 15/02* (2006.01)
*G08G 1/16* (2006.01)
*B60W 30/00* (2006.01)
*B60W 10/20* (2006.01)

(52) U.S. Cl.
CPC .................................. *B62D 15/0265* (2013.01)

(58) Field of Classification Search
CPC .................................................. B62D 15/0265
See application file for complete search history.

(56) References Cited

U.S. PATENT DOCUMENTS

| 6,571,176 | B1* | 5/2003 | Shinmura et al. | 701/301 |
| 2008/0086269 | A1* | 4/2008 | Joe et al. | 701/301 |
| 2009/0099728 | A1* | 4/2009 | Ichinose et al. | 701/39 |
| 2010/0030426 | A1* | 2/2010 | Okita | 701/41 |

FOREIGN PATENT DOCUMENTS

JP          2009-137344 A      6/2009

* cited by examiner

*Primary Examiner* — Helal A Algahaim
*Assistant Examiner* — Charles J Han
(74) *Attorney, Agent, or Firm* — McDermott Will & Emery LLP

(57) ABSTRACT

There is provided a vehicle power steering control apparatus. A steering control unit sets a base assist torque Tb based upon a vehicle speed and a steering torque. When an obstacle ahead is detected by an image recognition device, the steering control unit calculates an overlapping ratio between the obstacle and the vehicle in the widthwise direction. When an absolute value of the overlapping ratio is larger than a predetermined threshold value, the steering control unit increases the base assist torque for correction, and when the absolute value is equal to or smaller than the predetermined threshold value, it decreases the base assist torque for correction. The steering control unit outputs the calculated value to a motor drive unit as a control quantity (assist torque).

4 Claims, 5 Drawing Sheets

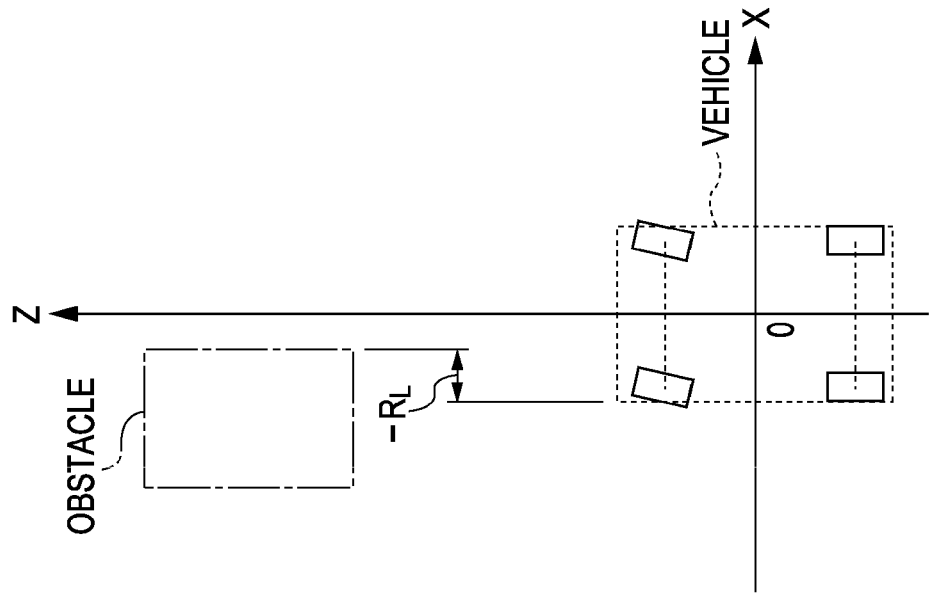
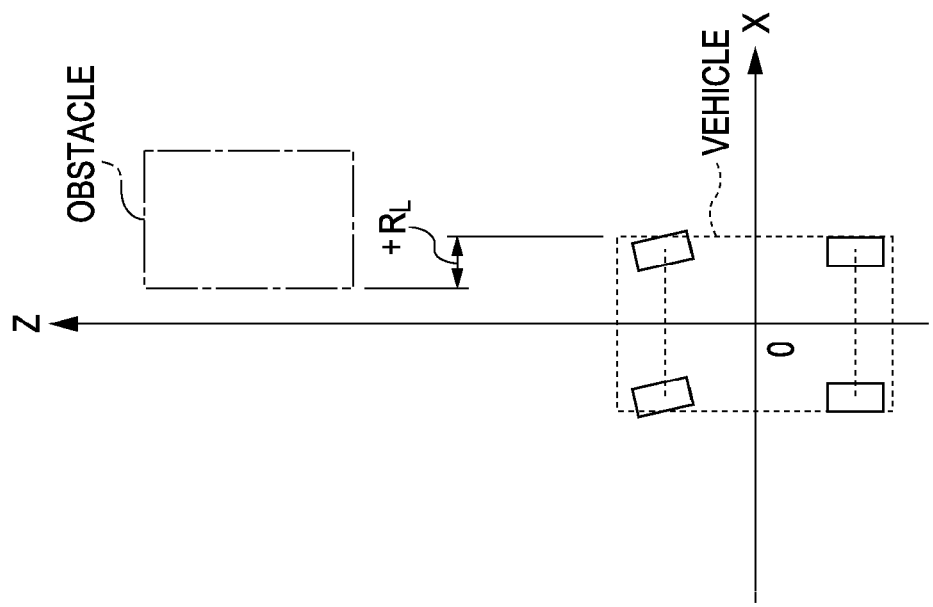

VEHICLE POWER STEERING CONTROL APPARATUS

CROSS-REFERENCE TO RELATED APPLICATIONS

The present application claims priority from Japanese Patent Application No. 2011-056804 filed on Mar. 15, 2011, the entire contents of which are hereby incorporated by reference.

BACKGROUND OF THE INVENTION

1. Field of the Invention

The present invention relates to a vehicle power steering control apparatus that appropriately controls an assist torque for a steering torque of a driver, when there is an obstacle ahead.

2. Description of Related Art

There have recently been proposed various vehicular driving support apparatuses for detecting an obstacle ahead of a subject vehicle so as to avoid a collision against the obstacle ahead. In order to avoid the collision against the obstacle ahead, a braking operation and turning operation are generally executed. As a technique of avoiding the collision with the obstacle ahead by the turning operation, Japanese Patent Application Laid-Open (JP-A) No. 2009-137344 (hereinafter referred to as JP-A No. 2009-137344) describes a steering force control apparatus, for example. When an object is detected ahead of a vehicle, and a degree of risk (inverse number of an allowance time) is a first risk degree or higher, a first correction gain to a base assist torque based upon a steering operation state by a driver and a second correction gain to a behavior-stabilization assist torque based upon a vehicle behavior are increased, and then, a total assist torque is calculated in order that the driver can easily make a steering operation for avoiding the collision with a low steering toque.

Under the condition where the driver makes the steering operation for avoiding the obstacle ahead of the vehicle, the vehicle may enter an unstable and dangerous situation after the driver makes the steering operation for avoiding the obstacle that is a subject to be avoided, because the steering operation for avoiding the collision is excessive. According to the technique described in JP-A No. 2009-137344, the vehicle behavior described above is suppressed by the behavior-stabilization assist torque based upon the vehicle behavior. However, the correction is made only in an increasing region of the assist torque. Therefore, an excessive steering by the driver cannot be prevented, whereby an effective measure cannot be taken.

SUMMARY OF THE INVENTION

The present invention is accomplished in view of the above-mentioned circumstance, and aims to provide a vehicle power steering control apparatus that appropriately predicts a series of steering condition for avoiding an obstacle ahead of a vehicle by a driver's steering, and appropriately sets an assist torque to a driver's steering torque generated during from when the steering for avoiding the obstacle ahead is made to when the obstacle avoidance is finished, thereby enhancing safety and reliability.

A vehicle power steering control apparatus according to an aspect of the present invention includes a base assist torque setting unit for setting a base assist torque, which serves as a base value of an assist torque for a steering torque, according to a driving condition of a vehicle; an obstacle-ahead information detecting unit for detecting obstacle-ahead information of the vehicle; an assist torque correcting unit for determining an avoidance condition by a steering to an obstacle ahead when the obstacle-ahead information detecting unit detects the obstacle ahead, and increasing the base assist torque for correction until the vehicle reaches a preliminarily set steering condition where it can be determined that the obstacle ahead has been avoided by the steering, while decreasing the base assist torque for correction in the preliminarily set steering condition where it can be determined that the obstacle ahead has been avoided by the steering; and a steering control unit for controlling an actuator that assists the steering torque based upon the set base assist torque.

The vehicle power steering control apparatus according to the present invention appropriately predicts a series of steering condition for avoiding an obstacle ahead of the vehicle by a driver's steering, and appropriately sets an assist torque to a driver's steering torque generated during from when the steering for avoiding the obstacle ahead is made to when the obstacle avoidance is finished, thereby enhancing safety and reliability.

BRIEF DESCRIPTION OF THE DRAWINGS

FIG. 4 is an explanatory view illustrating a overlapping ratio according to the embodiment of the present invention.

DETAILED DESCRIPTION OF THE PREFERRED EMBODIMENTS

Hereinafter, an embodiment of the present invention will be described with reference to the drawings.

Figure 1:
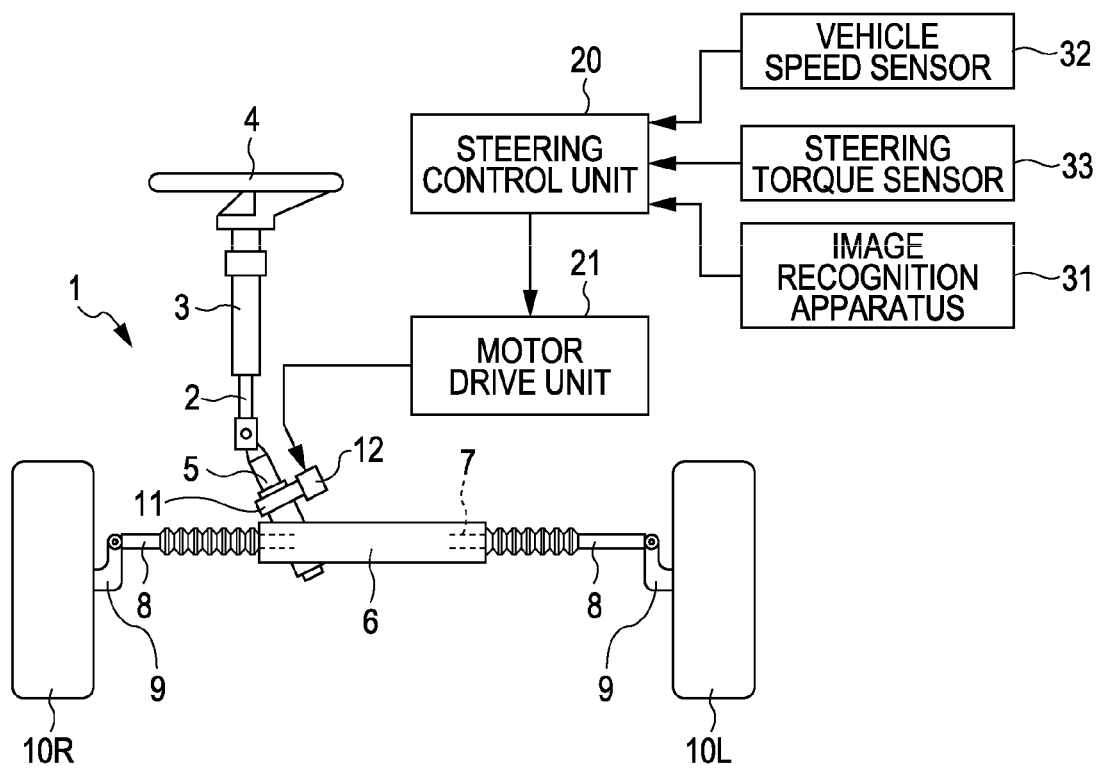
FIG. 1 is an explanatory view illustrating a structure of a steering system of a vehicle according to an embodiment of the present invention.

In FIG. 1, an electric power steering apparatus 1 has a steering shaft 2 that is supported by an unillustrated body frame via a steering column 3 so as to be rotatable. One end of the steering shaft 2 extends toward a driver's seat, while the other end thereof extends toward an engine compartment. A steering wheel 4 is fixed to an end of the steering shaft 2 on the side of the driver's seat, while a pinion shaft 5 is connected to an end extending toward the engine compartment.

A steering gear box 6 extending in a widthwise direction of the vehicle is disposed in the engine compartment. A rack shaft 7 is inserted into and supported by the steering gear box 6 so as to be able to reciprocate. A pinion (not illustrated) formed on the pinion shaft 5 is meshed with a rack (not illustrated) formed on the rack shaft 7, whereby a rack and pinion type steering gear mechanism is formed.

Left and right ends of the rack shaft 7 project from the ends of the steering gear box 6, and a front knuckle 9 is connected to each of the ends through a tie rod 8. The front knuckles 9 support left and right wheels 10L and 10R, serving as steered wheels, so as to be turnable, and are supported by the body frame through a king pin (not illustrated) so as to be steerable.

Therefore, when the steering wheel 4 is operated to rotate the steering shaft 2 and the pinion shaft 5, the rack shaft 7 moves in the lateral direction due to the rotation of the pinion shaft 5, whereby the front knuckle 9 pivots about the king pin (not illustrated) by this movement, which steers the left and right wheels 10L and 10R in the lateral direction.

An electric motor 12 is connected to the pinion shaft 5 via an assist transmission mechanism 11. The electric motor 12 assists a steering torque applied to the steering wheel 4. The electric motor 12 is controlled and driven through a motor drive unit 21 with a control quantity (in the present embodiment, with an assist torque Ta) set in a later-described steering control unit 20. The control quantity may be a current value corresponding to the assist torque Ta.

An image recognition device 31 for detecting obstacle-ahead information, a vehicle speed sensor 32 for detecting a vehicle speed (V), and a steering torque sensor 33 for detecting a steering torque Ts applied to the steering wheel 4 are connected to the steering control unit 20.

Image information is input to the image recognition device 31 from a stereo camera constituted by left and right CCD cameras (not illustrated), which are attached on front portions of a ceiling of a passenger compartment with a predetermined distance therebetween to capture images of external, subjects in stereo from different points of view and output the captured image information. The CCD cameras are made of a solid imaging device such as a charge-coupled device (CCD). A vehicle speed V of the vehicle is also input to the image recognition device 31 from the vehicle speed sensor 32. The image recognition device 31 recognizes forward information such as three-dimensional object data and white line data ahead of the vehicle based on the image information from the stereo camera, and estimates a road on which the vehicle is traveling based on the recognized information. The image recognition device 31 examines whether or not there is a three-dimensional object on the road on which the vehicle is traveling. If there is a three-dimensional object, the image recognition device 31 recognizes the object closest to the vehicle as an obstacle that is a control subject for collision avoidance control by a braking operation.

The image recognition device 31 processes the image information from the stereo camera as follows, for example. First, the image recognition device 31 generates distance information from a difference between corresponding positions in a pair of stereo images, which is obtained by capturing the environment ahead of the vehicle in the traveling direction with the stereo camera, by utilizing a principle of triangulation. Then, the image recognition device 31 groups the distance information by a known grouping process, and compares the grouped distance information with three-dimensional road shape data, three-dimensional object data or the like preliminarily set so as to extract white line data, side-wall data such as a guardrail or a curb present along the road, three-dimensional data such as a vehicle, and the like. Then, the image recognition device 31 estimates the road on which the vehicle is traveling based on the white line data, the side-wall data, the estimated road on which the vehicle is traveling and the like, and detects (captures) a three-dimensional object, closest to the vehicle, which is present ahead of the vehicle on the road, as an obstacle that is a control subject for collision avoidance control. When the image recognition device 31 detects the obstacle, it calculates, as obstacle information, a relative distance d between the vehicle and the obstacle, a moving speed Vf of the obstacle (=(a ratio of a change in the relative distance d)+vehicle speed (V)), and a deceleration of the obstacle (=a differential value of the moving speed Vf of the obstacle). As described above, the image recognition device 31 serves as an obstacle-ahead information detecting unit in the present embodiment. In the present embodiment, the obstacle-ahead information is detected and recognized based upon the image information from the stereo camera. However, it may be recognized based upon image information from a monocular camera.

The steering control unit 20 sets the base assist torque Tb based upon the vehicle speed V and the steering torque Ts. When detecting the obstacle ahead by the image recognition device 31, the steering control unit 20 calculates an overlapping ratio RL (=a ratio of the width of the obstacle overlapped with the width of the vehicle: FIG. 4) between the obstacle and the vehicle in the widthwise direction. When an absolute value |RL| of the overlapping ratio is larger than a predetermined threshold value RLS, the steering control unit 20 increases the base assist torque for correction, and when the absolute value |RL| is equal to or smaller than the threshold value RL, it decreases the base assist torque for correction. The steering control unit 20 outputs the calculated value to the motor drive unit 21 as a control quantity (assist torque Ta). As described above, the steering control unit 20 serves as a base assist torque setting unit, an assist torque correcting unit, and a steering control unit.

Figure 2:
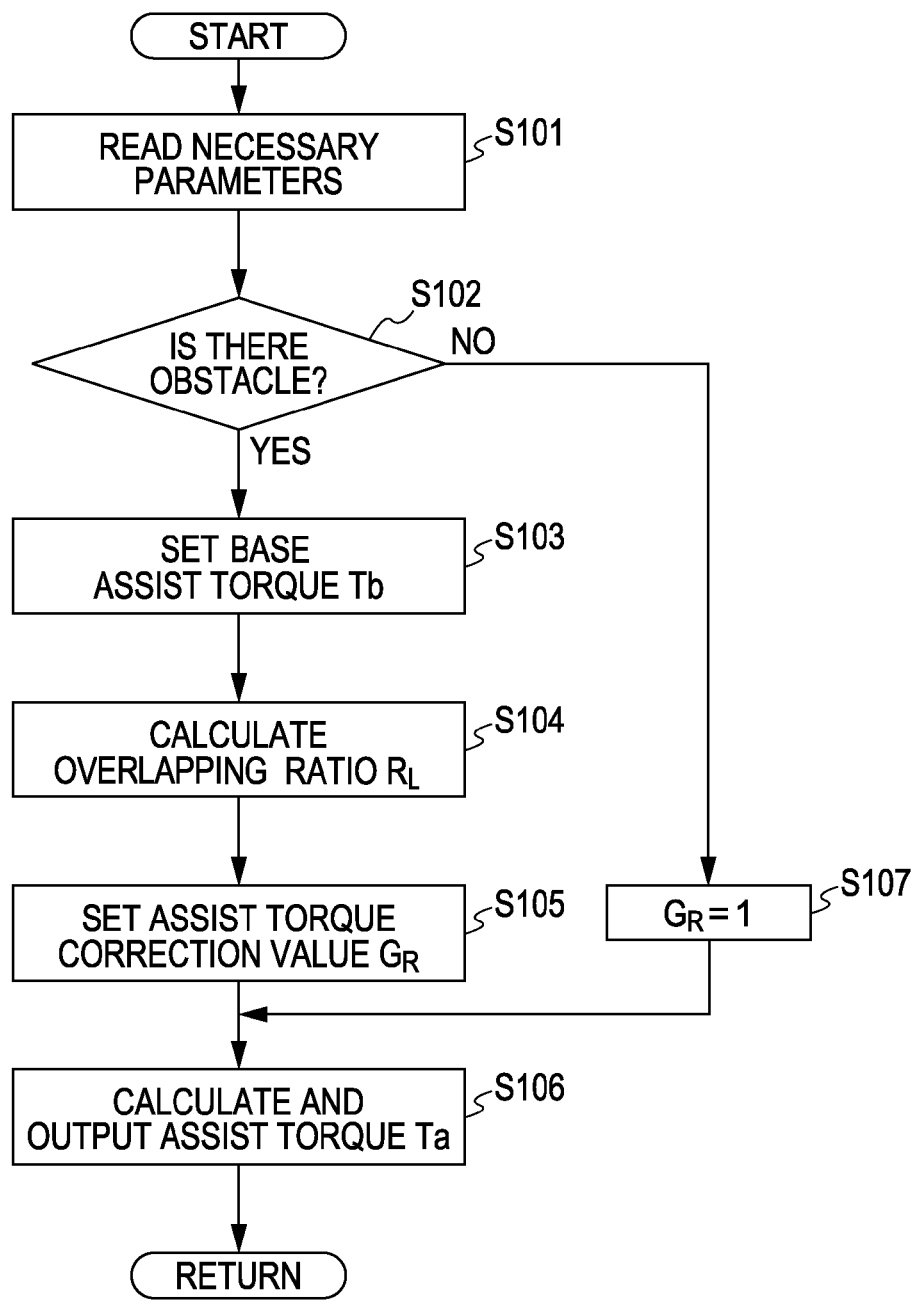
FIG. 2 is a flowchart illustrating a power steering control program according to the embodiment of the present invention.

A power steering control executed in the above-mentioned steering control unit 20 will be described with reference to a flowchart in FIG. 2.

Firstly, in step (hereinafter simply referred to as "S") 101, necessary parameters, which are obstacle information, the vehicle speed V, and the steering torque Ts, are read.

Figure 3:
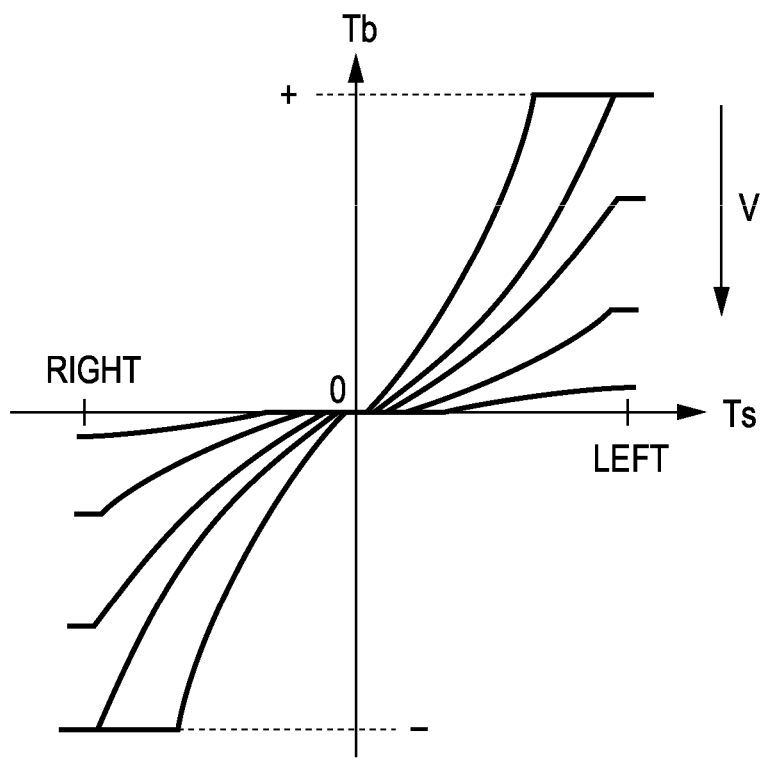
FIG. 3 is an explanatory view illustrating an example of a characteristic of a base assist torque according to the embodiment of the present invention.

Then, the steering control unit 20 proceeds to S102 so as to determine whether or not there is an obstacle. When there is an obstacle, the steering control unit 20 proceeds to S103 where it refers to a predetermined map (illustrated in FIG. 3, for example) so as to set the base assist torque Tb, which is the base value of the assist torque for the steering torque, based upon the vehicle speed V and the steering torque Ts.

The steering control unit 20 then proceeds to S104 for calculating the overlapping ratio RL (=a ratio of the width of the obstacle overlapped with the width of the vehicle) between the obstacle and the vehicle. When the obstacles is present as being lapped with the vehicle 1 at the right side (in the case of FIG. 4A), the overlapping ratio RL is indicated to have a + sign, and calculated as a value of (coordinate at right end of the vehicle 1)−(coordinate at left end of the obstacle S), as illustrated in FIG. 4. On the contrary, when the obstacle S is present as being lapped with the vehicle 1 at the left side (in the case of FIG. 4B), the overlapping ratio RL is indicated, so have a − sign, and calculated as a value of (coordinate at left end of the vehicle 1)−(coordinate at right end of the obstacle S).

Figure 5:
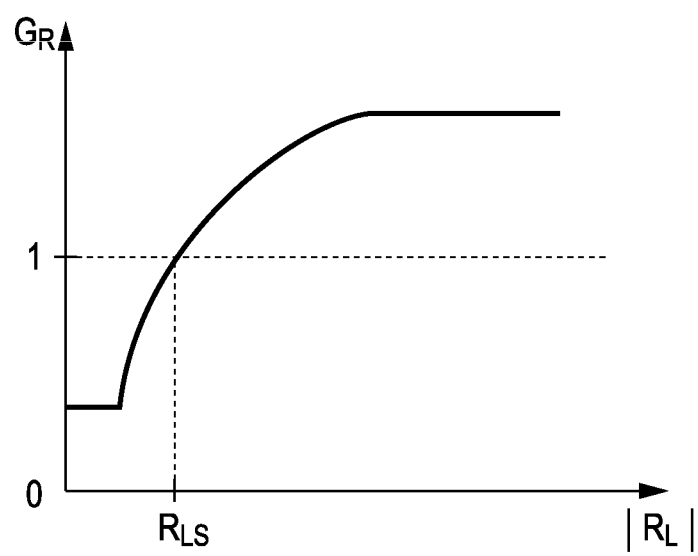
FIG. 5 is a characteristic view of an assist torque correction value according to the embodiment of the present invention.

Then, the steering control unit 20 proceeds to S105 where it refers to a characteristic chart of an assist torque correction value GR illustrated in FIG. 5 to set the assist torque correction value GR according to the absolute value |RL| of the lap ratio. The characteristic chart of an assist torque correction value GR is obtained in advance by a test, a calculation and the like. Then, the steering control unit 20 proceeds to S106.

On the other hand, when it is determined that there is no obstacle present as a result of the determination in S102, the steering control unit 20 proceeds to S107 so as to set the assist torque correction value GR as 1 (GR=1), and then, proceeds to S106.

After the steering control unit 20 sets the assist torque correction value GR in S105 or S107, and then, proceeds to S106, it multiplies the base assist torque Tb by the assist torque correction value GR so as to calculate the assist torque Ta (Ta=GR●Tb), and outputs the calculated value to the motor drive unit 21 as the control quantity (assist torque Ta).

The characteristic of the assist torque correction value GR is as illustrated in FIG. 5. RLS is the absolute value |RL| of the overlapping ratio upon GR=1 that is set when there is no obstacle (that is set as the base). In the case where the assist torque correction value GR is set larger than 1, and the assist torque Ta is increased for correction, the region of the absolute value |RL| of the overlapping ratio is larger than RLS. On the other hand, in the case where the assist torque correction value GR is set smaller than 1, and the assist torque Ta is decreased for correction, the region of the absolute value |RL| of the overlapping ratio is smaller than RLS.

Specifically, when the absolute value |RL| of the overlapping ratio is larger than the threshold value RLS, the assist torque correction value GB is set larger than 1, whereby it is corrected such that the driver's steering torque is decreased more than an ordinary case in which there is no obstacle. Accordingly, the driver can easily make the steering for avoidance. On the other hand, when the absolute value |RL| of the overlapping ratio is equal to or smaller than the threshold value RLS, it is determined that the driver can avoid the obstacle ahead by the steering, so that the assist torque correction value GR is set smaller than 1. Therefore, it is corrected such that the driver's steering torque is increased more than the ordinary case in which there is no obstacle, which can prevent the driver from performing an excessive steering for avoidance. Consequently, the vehicle power steering control apparatus appropriately predicts a series of steering conditions made by the driver for avoiding the obstacle ahead by the steering, and appropriately sets the assist torque to the driver's steering torque generated during from when the steering for avoiding the obstacle ahead is made to when the obstacle avoidance is finished, thereby enhancing safety and reliability.

What is claimed is:

1. A vehicle power steering control apparatus comprising:
   a base assist torque setter configured to set a base assist torque which serves as a base value of an assist torque for a steering torque, according to a driving condition of a vehicle;
   an obstacle-ahead information detector configured to detect obstacle-ahead information of the vehicle by processing an image in front of the vehicle, the obstacle-ahead information including left and right edges of an obstacle in the image;
   an assist torque corrector configured to
      recognize a positional relationship between the obstacle and the vehicle based on the obstacle-ahead information,
      determine an overlapping distance from one of the left and right edges of the obstacle to one of the left and right edges of the vehicle, the one of the left and right edges of the obstacle being an edge of the obstacle located closest to a center of the vehicle, the one of the left and right edges of the vehicle being an edge of the vehicle located closest to a center of the obstacle,
      calculate an overlapping ratio, wherein the overlapping ratio is defined as the overlapping distance divided by the width of the own vehicle, and
      when an absolute value of the overlapping ratio is greater than a threshold value, increase the base assist torque, and
      when the absolute value of the overlapping ratio is equal to or less than the threshold value, decrease the base assist torque; and
   a steering control unit configured to control an actuator for assisting the steering torque based upon the base assist torque.

2. The vehicle power steering control apparatus according to claim 1, wherein the base assist torque, which is increased or decreased for correction by the assist torque correcting unit, based on a value of the base assist torque, is set under a condition in which the obstacle ahead is not detected.

3. A vehicle power steering control apparatus comprising:
   at least one sensor configured to detect a driving condition of a vehicle;
   an image sensor to obtain an image in front of the vehicle;
   an image processor configured to recognize an obstacle existing in a traveling direction of the vehicle based on the image from the image sensor, the obstacle recognized having left and right edges; and
   a processor configured to:
      set a base value assist of an assist torque for a steering torque, according to the driving condition detected by the at least one sensor;
      recognize a positional relationship between the obstacle and the vehicle based on the obstacle recognized in the image;
      determine an overlapping distance from one of the left and right edges of the obstacle to one of the left and right edges of the vehicle, the one of the left and right edges of the obstacle being an edge of the obstacle located closest to a center of the vehicle, the one of the left and right edges of the vehicle being an edge of the vehicle located closest to a center of the obstacle,
      calculate an overlapping ratio, wherein the overlapping ratio is defined as the overlapping distance divided by the width of the own vehicle, and
      when an absolute value of the overlapping ratio is greater than a threshold value, increase the assist torque;
      when the absolute value of the overlapping ratio is equal to or smaller than the threshold value, decrease the assist torque; and
      control an actuator for assisting the steering torque, based upon the assist torque.

4. The vehicle power steering control apparatus according to claim 3, wherein the base value of the base assist torque to be increased or decreased is set under a condition in which no obstacle is detected in front of the vehicle.

* * * * *